United States Patent [19]
Bordes

[11] 3,753,322
[45] Aug. 21, 1973

[54] METHODS FOR THE MANUFACTURE OF LIGHTWEIGHT OPTICAL PARTS

[75] Inventor: Roger Rene Bordes, Puteaux, France
[73] Assignee: ETAT Francais Delegation Ministerielle pour L'Armement, Paris, France
[22] Filed: Jan. 27, 1971
[21] Appl. No.: 110,124

[30] Foreign Application Priority Data

Jan. 28, 1970  France............................7002892
Jan. 7, 1971  France............................7100278

[52] U.S. Cl. ................. 51/284, 51/59 SS, 117/4, 350/310
[51] Int. Cl. .................... B24b 1/00, B24b 9/14
[58] Field of Search .................. 51/283, 284, 59 SS; 350/310, 288; 29/527.1; 117/4

[56] References Cited
UNITED STATES PATENTS
3,613,222  10/1971  Richey .............................. 51/284 X
3,561,462  2/1971  Jugler .............................. 51/59 SS
2,850,854  9/1958  Levy .............................. 51/59 SS X
3,514,275  5/1970  Bray .............................. 350/288 UX

FOREIGN PATENTS OR APPLICATIONS
1,126,930  9/1968  Great Britain ...................... 350/310

*Primary Examiner*—Donald G. Kelly
*Attorney*—Waters, Roditi, Schwartz & Nissen

[57] ABSTRACT

A process for the manufacture of lightweight optical parts, comprises forming at least one optical surface on a solid blank by machining and mechanical polishing, ultrasonically machining cavities underlying the optical face in at least one of the remaining faces of the blank to reduce the weight of the article and finally depositing an optical coating on the optical surface. The weight reducing recesses can be made in the face of the blank opposite the optical surface or they can be formed in lateral surfaces of the blank. An ultrasonic generator is disclosed with an electrode serving as a machining tool.

7 Claims, 9 Drawing Figures

METHODS FOR THE MANUFACTURE OF LIGHTWEIGHT OPTICAL PARTS

BRIEF SUMMARY OF THE INVENTION

The present invention relates to a new process for manufacturing lightweight optical parts from extremely hard material wherein such parts have at least one optical face of high reflectivity and another face with spaced recesses therein for weight reducing purposes.

Such optical parts are used especially in sighting instruments mounted on gyrostabilizers and in optical equipment carried on aircraft or astronautical devices e.g. helicopters, airplanes, manmade satellites, etc.

For this reason, such parts must possess not only extremely high microgeometric precision to obtain the high reflectivity but they also must be of very low weight and have very good dimensional stability in order to resist the great temperature differences and considerable vibration to which such instruments may be subjected.

Hitherto, such optical parts have been made from molded slabs provided with pattern-formed lightening cavities during the molding operation.

In the known method, the molded slab is fixed at its hollowed-out face to a bedplate by means of gate sticks (rod-shaped supports in a mixture of pine resin, sealing wax and cracklings tallow) which imparts to the slab a rigidity compatible with the stresses to which it will be subjected during subsequent processing, and then the slab is mechanically machined to the desired thickness. The machined slab is then mechanically polished with cerium oxide. The machined and polished slab is now removed from its support. Finally it is given a deposit of optical coating through evaporation under vacuum at high temperature.

However, such molded slabs are not of uniform thickness because of shrinkages and deformations that occur in the filling and cooling of the mold. The machining of material immediately afterwards releases residual internal stresses and produces deformations in the product.

Furthermore, the final finishing stages e.g., machining, polishing, etc. do not allow great geometric and microgeometric precision to be obtained because gauge scatter is high and the interference fringes are irregular.

Moreover, when processing is finished, the separation of the machined and polished part from its support releases stresses which further diminishes the geometric and microgeometric precision of such part.

In sum, the known processes for making lightweight optical parts have the following drawbacks:

they do not permit substantial reduction of weight (not more than 20 percent) in view of the fact that the molding processes do not allow reducing thicknesses beyond limit values (greater than 6mm) due to internal stresses caused by the molding;

they do not give high geometric and microgeometric precision, due to the strain and handling required by the finishing processes;

they do not admit of calculation of the mechanical strength (moments of inertia, etc.) because of the lack of planes of symmetry;

they impart a state of permanent deformation on the finished parts resulting from the very considerable removal of material imposed by the known processes;

the volumetric reduction of material contributes an imbalance, which itself is a source of deformation; and they involve long periods for production because of the special tooling required.

An object of this invention is to provide a new process for the manufacture of lightweight optical parts of extremely hard materials, such as vitreous materials e.g., glass, quartz, fluorospar, synthetic ruby, white sapphire, ceramic ware, or other material of a hardness greater than or equal to Rockwell number 50, which avoids the above deficiencies. The optical part which is produced has at least one optical face of high reflectivity and high geometric and microgeometric precision and it has recesses in another face for assuring maximum weight reduction while retaining dimensional stability.

The process comprises subdividing from a mass of hard material a solid blank thus assuring a homogeneous structure and eliminating sources of deformation associated with molded slabs. One or more optical faces are then formed by mechanical machining and polishing by which a geometric and microgeometric state of high precision can be obtained since the work is effected on a solid, rigid, one-piece blank. Furthermore, the monobloc form of the blank allows its direct engagement on the bedplate without intermediate supports or gate sticks, so that the resulting stresses are always lower than the critical rate at which the blank would commence deforming upon detachment from the bedplate; such detachment is accordingly effected without damage to the precision machined face.

Next, the optical part so obtained is reduced in weight by ultrasonically machining cavities in one or more of the remaining faces of the part. For this purpose, the tool used is vibrated by an ultrasonic source and it discharges onto the part to be machined very fine-grain abrasive conveyed in a liquid and fed between the tool head and the part to be machined, the tool head being of the same sectional shape as the cavity to be machined.

It is surprising that the machining of weight reducing cavities by ultrasonics does not produce any internal stresses nor any deformation of the already formed face. Considering this fact, the thickness of the webs between adjacent recesses can be considerably reduced (down to 0.5mm) and very high ratios of weight reduction can be achieved (up to 80 percent of the weight of the blank), as against 6mm and 20 percent respectively by the conventional methods.

The optical part so lightened is then given in known manner an optical coating on its precision machined face by high-temperature, vacuum-evaporation deposition.

According to a first embodiment of the process of the invention, one starts with a solid blank having two parallel planar-faces and first forms the optical face on one of said faces and then machines the cavities in the other face.

According to a second embodiment of the process of the invention, one starts with a solid blank having two parallel plane faces, and first forms two optical faces on said faces and then machines the cavities into one or more side faces of the blank, each of these optical faces being adapted to receive a different optical coating.

According to a third embodiment of the process of the invention, one starts with a solid prism-shaped blank, and first forms optical faces on the lateral faces of the prism and then machines the cavities on the base face of the prism, each of said optical faces being adapted to receive a different optical treatment as required.

By the process of the invention lightweight optical parts of an extremely hard material are produced each of which comprises on the one hand at least one optical face of high reflectivity and high geometric and microgeometric precision and, on the other hand, cavities in the face opposite said optical face and defining a thin network of strengthening ribs joined to a web of reduced thickness carrying said optical face and at the same time providing maximum weight reduction and high rigidity for the part.

An ultrasonic machining device for effecting machining of the weight reducing cavities in such optical parts comprises:

a. a magnetostrictive ultrasonic generator operative at a frequency of at least 20,000 cps;

b. a steel or titanium tool mounted at the outlet of a magnetostrictor amplifier unit, said tool having a terminal scarfed portion whose end is identical in section with the cavity to be machined, the overall length of the tool being approximately 120 mm and the scarfed portion approximately 60 mm.

c. a bracket arranged beneath said tool for supporting and centering the part to be machined.

d. a source of abrasive material and at least one nozzle for feeding such material between the tool head and the part to be machined; and e. means for lowering and raising the tool and for regulating the machining pressure between the tool head and the part to be machined.

DETAILED DESCRIPTION

Figure 1:
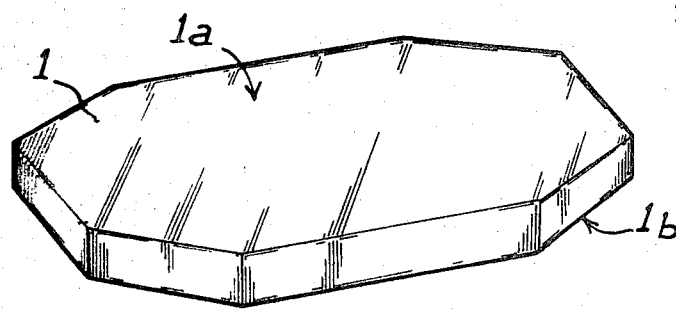
FIG. 1 is a perspective view of a blank from which an optical part is made.

FIG. 1 of the drawing shows a monobloc blank 1 of octagonal shape with two parallel plane faces $1a$, $1b$. The blank 1 can be cut, for example, from a block of annealed glass.

Figure 2:
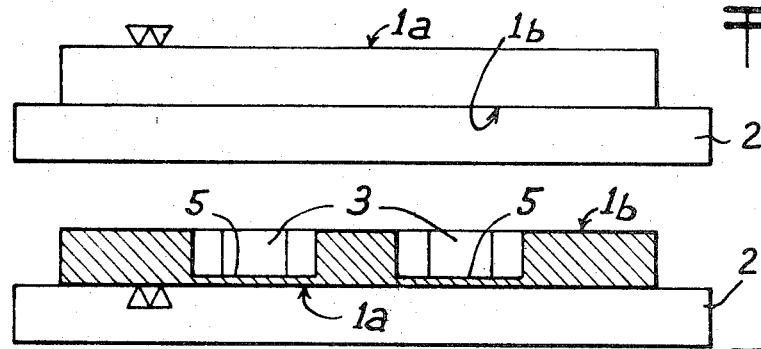
FIG. 2 is a front elevation view of the blank mounted on a bed plate and ready for the machining of the optical face.

The blank is mounted on a bed plate 2 (FIG. 2) by means of optical cement, the face $1b$ being placed directly on the bed plate. Face $1a$ is machined with a cerium oxide polisher until an optical face of high reflectivity is obtained.

Figure 3:
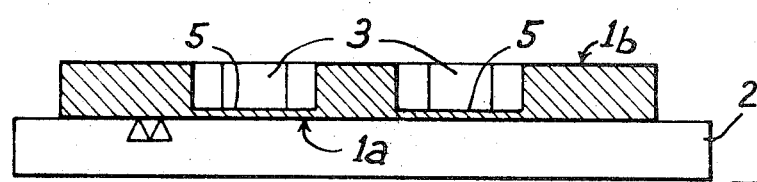
FIG. 3 is a sectional elevation of the machined blank which has been inserted and mounted on the bed plate and subjected to ultrasonic machining of weight reducing cavities therein.
Figure 4:
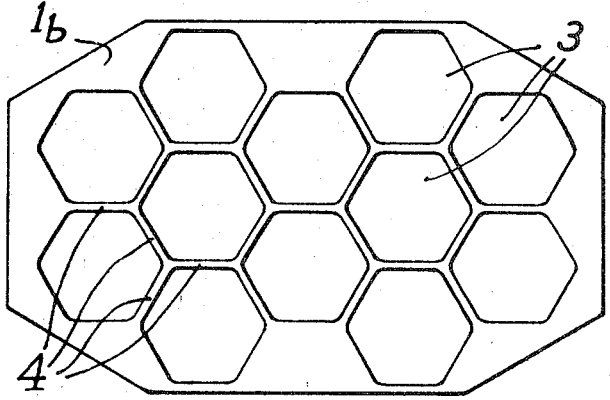
FIG. 4 is a bottom view of the finished optical part showing the honeycomb of a strengthening rib network and weight reducing cavities.

The blank is then turned over and fixed to the bed plate with optical cement, the polished face $1a$ being placed directly on said bed plate (FIG. 3).

Hexagonal-section recesses or cavities 3 are then machined ultrasonically in face $1b$ to a distance of 1 mm from the polished face $1a$.

These recesses define a very delicate network of strengthening ribs 4 integral with and extending perpendicularly to thin web 5 (1 mm) carrying the optical face $1a$. After deposit of an optical coating on face $1a$ by evaporation of aluminum in vacuum ($10^{-6}$ mm mercury) at high temperature, a light weight mirror with one reflecting face is obtained. The ultrasonic machining process will be described later in detail.

Figure 5:
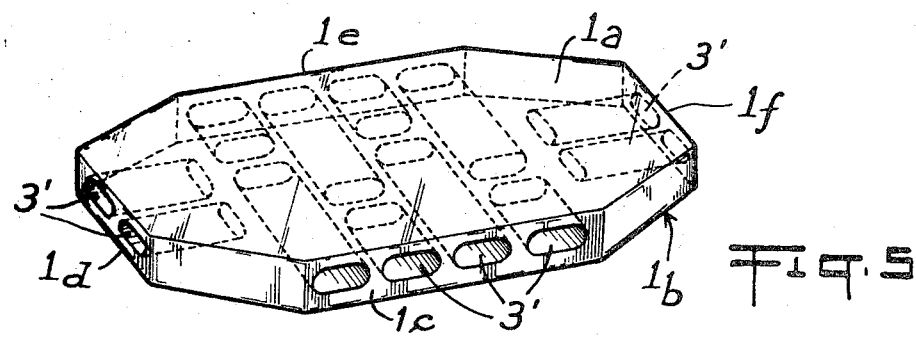
FIG. 5 is a perspective view of a variant of the optical part in FIG. 4.

According to a modification, shown in FIG. 5, the blank is polished on both its parallel plane faces $1a$, $1b$ to produce two optical faces of high reflectivity.

The weight reduction of the part is effected by ultrasonic machining of oblong hollow recesses $3'$ in four lateral faces $1c$, $1d$, $1e$, $1f$ of the part.

After deposit of an optical coating on each of the faces $1a$, $1b$, a lightweight mirror with two reflecting surfaces is obtained.

Figure 6:
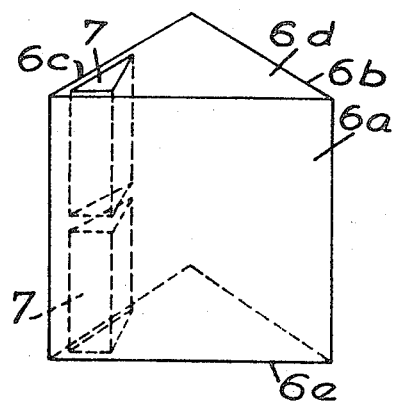
FIG. 6 is a perspective view of another variant of the optical part in FIG. 4.

According to a second modification shown in FIG. 6, the blank is in the form of a triangular-section prism. The blank is in the form of a triangular-section prism. The blank is polished on its three side faces $6a$, $6b$, $6c$ to form three optical faces of high reflectivity and it is reduced in weight by ultrasonic machining of hollow recesses 7 (of which two only are shown for the sake of simplicity) in the base faces $6d$ and $6e$.

Each of the faces $6a$, $6b$, $6c$ can be given a different optical treatment. For example, face $6a$ can be treated for a maximum reflection in yellow ($\lambda = 550$ m$\mu$), face $6b$ treated for infra red ($\lambda = 1,060$ m$\mu$) and face $6c$ treated for ultra violet ($\lambda = 380$ m$\mu$).

Figure 7:
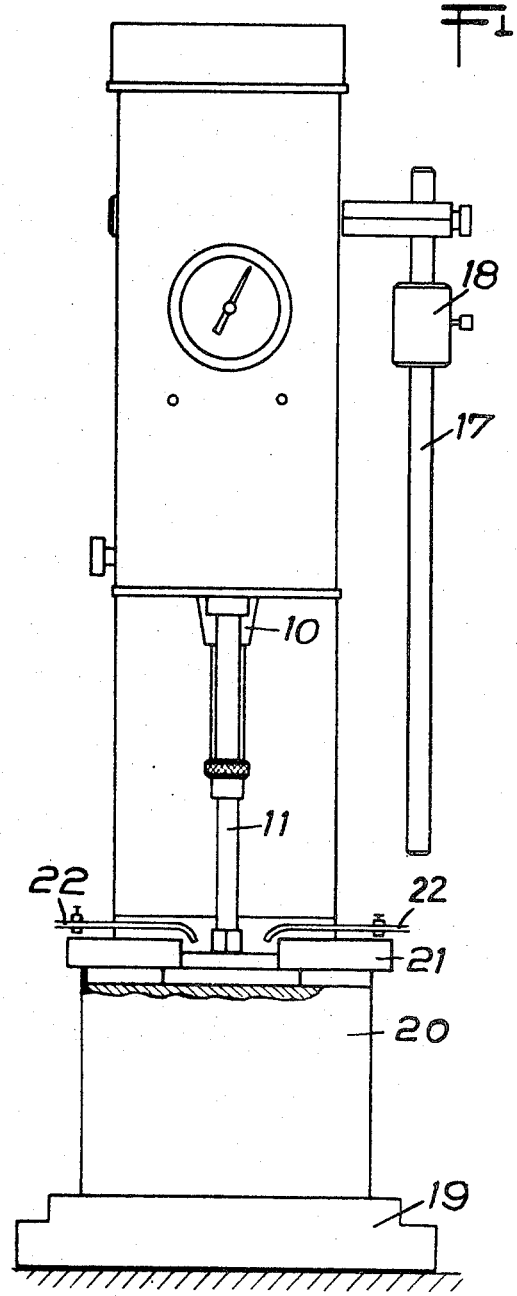
FIG. 7 is a front elevation view of an ultrasonic machining device.
Figure 8:
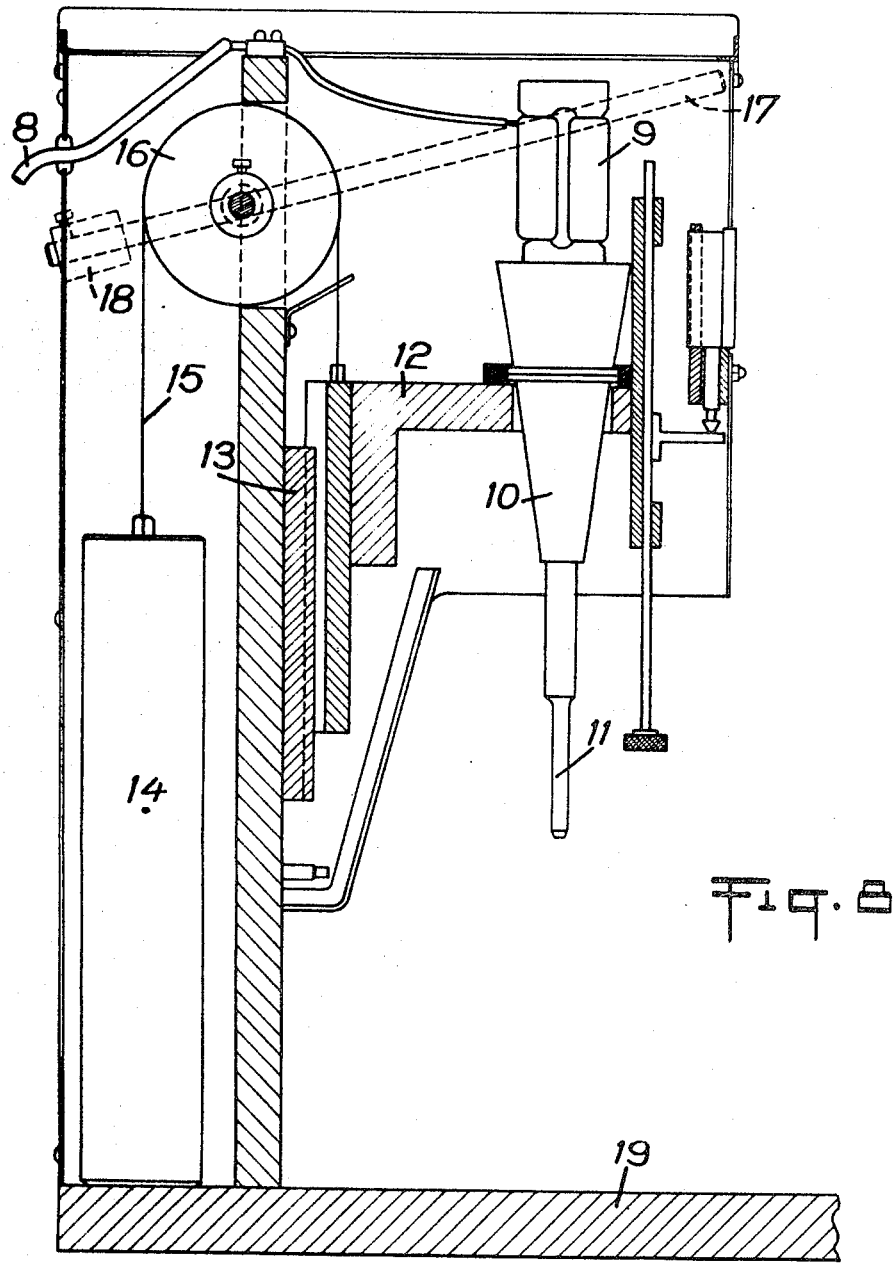
FIG. 8 is a sectional side-elevation view of the machining device.

For ultrasonic machining of the optical parts, an apparatus as shown in FIGS. 7 and 8 is used.

Figure 9:
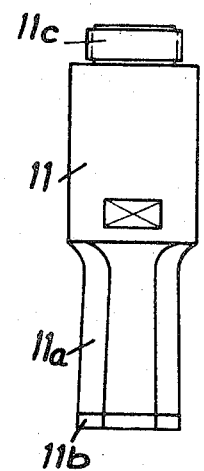
FIG. 9 is an elevation view of a tool of the machining device.

Such apparatus comprises a magnetostrictive ultrasonic generator having a magnetostrictor 9 which transforms alternating current at the frequency of approximately 20,000 cps, supplied by an amplifier cone 10, and then transmitted to a tool 11 which transforms the sound vibrations into mechanical vibrations in the form of longitudinal vibrations of the tool. The tool shown in FIG. 9 is of titanium with a scarfed portion $11a$ whose end $11b$ is of hexagonal section corresponding to that of the recess to be machined. The tool has an overall length of 120 mm, the scarfed portion being 60 mm.

The scarfed portion allows amplification of the vibrations transmitted to the tool by cone 10. The tool further has a threaded ferrule $11c$ for fitting the tool in said cone.

The tool head can have any suitable section, such as circular, elliptical, square, rectangular, etc.

The assembly of magnetostrictor 9 with amplifier cone 10 and tool 11 is carried on a bracket 12 which is mounted slidably in a micrometric guide 13 and attached to a counterweight 14 by a wire 15 wound over a pulley 16. The movement of the bracket is governed by a control lever 17 fixedly connected to pulley shaft 16, and adjustably supporting a weight 18, the lever 17 serving to adjust the machining pressure.

The working table 19 supports a tank 20 furnished with clamps 21 for mounting and centering the part to be machined and with nozzles 22 for feeding thereon an abrasive grain suspension of the following composition:

| Ingredients | Parts by Weight |
|---|---|
| Boron carbide (abrasive) (320 mesh) | 20–25 |
| Water | 100 |
| Alcohol | 30 |
| Wetting agent (Teepol) | 3 |

The nozzles 22 are connected to a reservoir containing the suspension and are fed through a pump (not shown).

The blank is mounted on the bedplate beneath tool 11 and the machining pressure is adjusted. The abrasive suspension is then conveyed by nozzles 22 between the blank and the tool and the ultrasonic generator is actuated.

The vibrated tool is not directly in contact with the part being machined, but it urges abrasive grain against the face of the part to be machined and thus forms a recess in the part having the same cross section as that of the tool head.

As soon as the recess is made, the tool is raised and the blank is moved into position for the machining of another recess.

Optical parts manufactured in this way comprise on the one hand a series of recesses and ribs which provide very high rigidity and minimum weight and, on the other hand, one or more optical surfaces with very high geometric and microgeometric properties.

What is claimed is:

1. A process for manufacturing a lightweight optical part from a monolithic blank of extremely hard material, said process forming at least one optical face on said part and then cutting weight reducing recesses in another face of the part, said cutting being effected by ultrasonic machining including progressively inserting an ultrasonic machining tool into the other face of the part to the final depth of the recess to form said recesses with uniform cross-sections over their full depth in said part.

2. A process as claimed in claim 1, wherein the blank has two parallel planar surfaces, the optical face being formed on one of said faces, the ultrasonic machining of the recesses then being effected on the other face.

3. A process as claimed in claim 1, wherein the blank has two parallel planar surfaces, two optical faces being formed on said surfaces whereafter the ultrasonic machining is effected in at least one of the lateral faces of the blank.

4. A process as claimed in claim 1, wherein the blank is a prism, the optical faces being formed on the lateral surfaces of said prism whereafter the ultrasonic machining is effected in at least one of the bases of the prism.

5. A process as claimed in claim 1 wherein said ultrasonic machining tool is inserted to a depth to provide a thickness of the remaining web at said other face of about 1mm, the recesses being adjacent to one another with a thickness of separating web of about 0.5 mm whereby to provide a weight reduction of up to 80 percent of the weight of said blank.

6. A process as claimed in claim 1 wherein said recesses are non-circular in cross-section.

7. A process as claimed in claim 1 wherein said tool is formed with the same cross-sectional shape as said recesses and is progressively inserted into said part without rotating.

* * * * *